(12) United States Patent
Darrell et al.

(10) Patent No.: US 6,260,658 B1
(45) Date of Patent: *Jul. 17, 2001

(54) SILENCER FOR A GAS TURBINE

(75) Inventors: Jahn D. Darrell, Shakopee; Robert A. Noreen, Eagen; Ronald E. Flitsch, Pine Island, all of MN (US); Scott E. Oehlke, Woodville, WI (US)

(73) Assignee: Donaldson Company, Inc., Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,215

(22) Filed: Oct. 23, 1998

(51) Int. Cl.$^7$ ........................................ E04F 17/04
(52) U.S. Cl. ........................................ 181/224; 181/229
(58) Field of Search ................... 181/224, 225, 181/229, 217, 218, 222

(56) References Cited

U.S. PATENT DOCUMENTS 2,270,825 * 1/1942 Parkinson et al. .................. 181/224
5,679,931 * 10/1997 Furse et al. ......................... 118/224
5,817,990 * 10/1998 Furse .................................. 181/224

OTHER PUBLICATIONS 9 sheets of photos taken by Donaldson personnel during the week of Mar. 18–22, 1998 at the Merilectrical site in Columbia near Barrancabermeja. The photos are of a silencer made by Universal Silencer Co., a Division of Nelson Industries.

* cited by examiner

Primary Examiner—Khanh Dang
(74) Attorney, Agent, or Firm—Merchant & Gould P.C.

(57) ABSTRACT

The present disclosure relates to a generally rectangular frame including two spaced-apart and substantially parallel end members interconnected by two spaced part and substantially parallel length members. The length members defined inwardly facing channels. Two spaced-apart perforated members are secured within the inwardly facing channels between the two spaced-apart length members. Sound absorbing material is compressed between the perforated members.

10 Claims, 9 Drawing Sheets

SILENCER FOR A GAS TURBINE

FIELD OF THE INVENTION

The present invention relates generally to noise control apparatuses. More particularly, the present invention relates to silencers for use with gas turbine engines.

BACKGROUND OF THE INVENTION

Gas turbine engines are known to generate large amounts of noise. Silencers are commonly used in a gas turbine air intake and outlet system to reduce or absorb the noise generated by the gas turbine.

One type of known silencer is commonly referred to as "splitter-type" silencer. Splitter-type silencers commonly include noise absorbing material (e.g. foam, mineral wool, fiberglass or balsalt wool) that is positioned between substantially parallel perforated panels. The perforated panels also cooperate to define open passageways through which high velocity air can be directed. When air is directed through the passageways, noise passes laterally from the passageway through the perforated walls and into the noise absorbing material. The noise absorbing material absorbs the noise and converts the noise to heat. The net effect of the splitter is to allow the air to pass through the splitter, while most of the noise will laterally pass through the perforations in the splitter walls and into the noise absorbing material.

Gas turbine system designers are constantly seeking to develop more effective designs that can be manufactured at reduced costs.

SUMMARY OF THE INVENTION

One aspect of the present invention relates generally to a silencer including a generally rectangular frame. The frame includes two spaced-apart and substantially parallel end members that are interconnected by two spaced-apart and substantially parallel length members. The length members define inwardly facing channels. The silencer also includes two spaced-apart perforated members secured within the inwardly facing channels between the two spaced-apart length members. The perforated members are longer than the length members and include end portions that overlap the end members. The end portions are fixedly connected to the outer surfaces of the end members such that the end members are fixed between the perforated members. The silencer also includes sound absorbing material positioned between the perforated members.

Another aspect of the present invention relates to a silencer including two spaced-apart, substantially parallel end members. The silencer also includes a volume of sound absorbing material. The silencer further includes two retaining members for retaining the volume of sound absorbing material. The retaining members extend between the end members and include perforated portions and reinforcing portions. The perforated portions are unitarily formed with the reinforcement portions. The perforated portions are spaced-apart and substantially parallel to one another, while the reinforcing portions are transversally aligned with respect to the perforated portions. The reinforcing portions extend inward from the perforated portions toward a central plane that longitudinally bisects the silencer and is generally parallel with respect to the perforated portions.

A further aspect of the present invention relates to a silencer including a generally rectangular frame. The frame includes two spaced-apart and substantially parallel end members interconnected by two spaced-apart and substantially parallel length members. The length members define inwardly facing channels. The silencer also includes two spaced-apart perforated members secured within the inwardly facing channel between the two spaced-apart length members. The silencer further includes sound absorbing material compressed between the perforated members.

Still further aspects of the present invention relate to methods for assembling or manufacturing silencers in accordance with the principles of the present invention.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION OF THE PREFERRED EMBODIMENT

Reference will now be made in detail to exemplary aspects of the invention that are illustrated in the accompanying drawings. Wherever possible, the same reference numbers will be used throughout the drawings to refer to the same or like parts.

Figure 1:
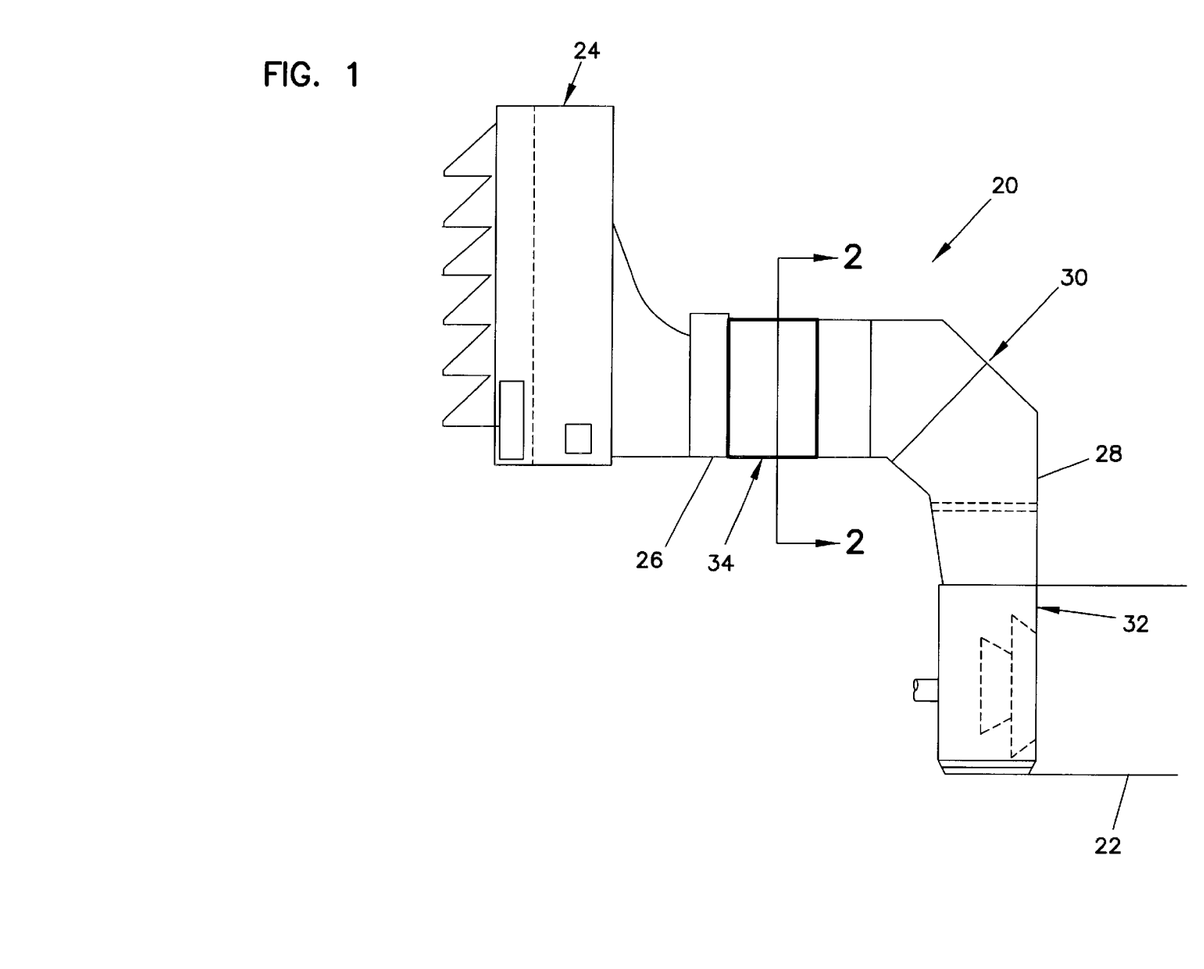
FIG. 1 is a schematic view of a gas turbine system constructed in accordance with the principles of the present invention.

FIG. 1 is a schematic view of an air intake system 20 for a gas turbine engine 22. The intake system 20 includes an initial air filtration unit 24 for removing contaminants and/or particulate matter from the intake air stream. A horizontal portion 26 of the intake system 20 is positioned downstream from the filtration unit 24. The horizontal portion 26 is connected to a substantially vertical portion 28 by an elbow 30. The vertical portion 28 of the intake system 20 is positioned immediately upstream from an inlet plenum 32 for the gas turbine engine 22.

An inlet silencer 34 is shown schematically positioned within the horizontal portion 26 of the air intake system 20. For ease of explanation, the various embodiments of the present invention will be described as they typically would be mounted in the horizontal portion 26. However, it will be appreciated that the embodiments could be mounted in horizontal, vertical or inclined configurations.

Figure 2:
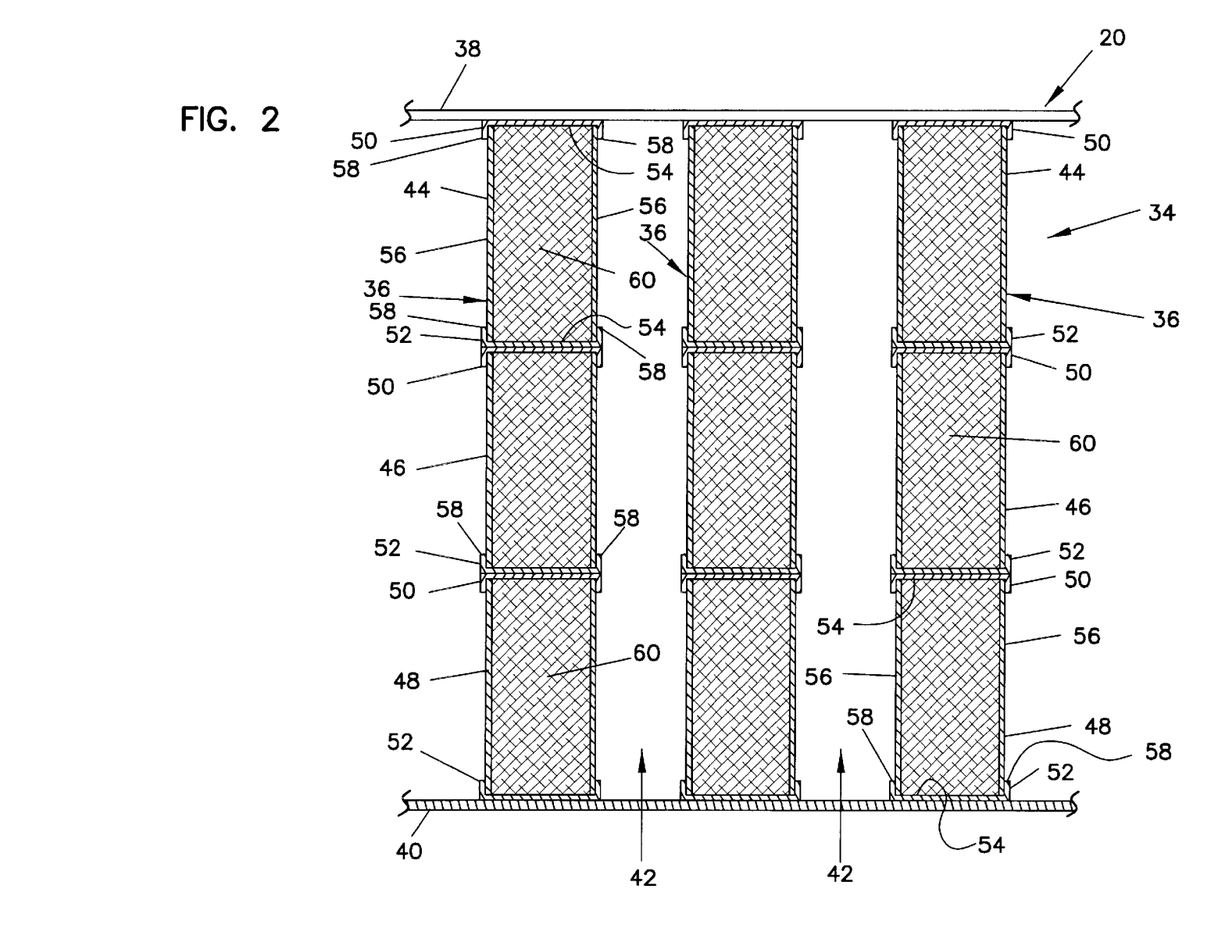
FIG. 2 is a cross-sectional view taken along section line 2—2 of FIG. 1.

FIG. 2 is a cross-sectional view taken along section line 2—2 of FIG. 1. FIG. 2 shows three spaced-apart and substantially parallel silencer units 36 of the inlet silencer 34. The silencer units 36 extend vertically between a top ducted wall 38 and a bottom duct wall 40. It will be appreciated that the silencer units 36 are secured to the top and bottom walls 38 and 40 by conventional techniques such as bolts, tracks, or spacer arrangements.

The silencer units 36 can be used in ducts of varying sizes. For example, smaller ducts are typically about 3 feet wide by 3 feet high, while larger ducts can be as large as 30 feet wide and 24 feet high. In particular embodiments of the present invention, the silencer units 36 can be 4 to 15 feet long, and can have heights from 3 to 24 feet.

The silencer units 36 are spaced-apart and substantially parallel. Air passageways 42 are defined between the silencer units 36. It will be appreciated that the relative dimensions of the silencer units 36, the air passageways 42 and the intake system 20 are not drawn to scale.

The silencer units 36 each include a top silencer module 44, an intermediate silencer module 46 and a bottom silencer module 48. The silencer modules 44, 46 and 48 are vertically stacked relative to one another. The top silencer module 44 is secured to the top duct wall 38, the bottom silencer module 48 is secured to the bottom duct wall 40, and the intermediate silencer module 46 is secured between the top and bottom silencer modules 44 and 48. In one particular embodiment, the intermediate silencer module 46 is welded between the top and bottom silencer modules 44 and 48. While three silencer modules are shown for each of the silencer units 36, it will be appreciated that more or fewer numbers of silencer modules could also be used.

Each of the silencer modules 44, 46 and 48 includes a top length member 50 positioned opposite from a bottom length member 52. The top and bottom length members 50 and 52 each have generally C-shaped cross sections and define inwardly facing channels 54. The term "inwardly facing channels" is intended to mean that the channels 54 face one another. In certain embodiments, the bottom length member 52 of each top module 44 can be connected (e.g. welded) to the top length member 50 of the corresponding intermediate module 46 in a back-to-back relationship. Similarly, the bottom length member 52 of each intermediate module 46 can be connected (e.g. welded) to the top length member of the corresponding bottom module 48 in a back-to-back relationship. The back-to-back length members 50 and 52 described above can be referred to as intermediate members.

Each of the modules 44, 46 and 48 also includes two spaced-apart and substantially parallel perforated members 56 (e.g. perforated plates, panels or sheets). The perforated members 56 are secured within the inwardly facing channels 54 of the top and bottom length members 50 and 52. Flanges 58 of the top and bottom length members 50 and 52 inhibit the perforated members 56 from being laterally displaced from the top and bottom length members 50 and 52. Sound absorbing material 60 (e.g. foam, wool, mineral wool, fiberglass, or balsalt wool) is captured or secured between the perforated members 56. Relatively thin protective layers (not shown) can be placed between the perforated member 56 and the sound absorbing material 60. The protective layers can be made of a material such as relatively thin fiberglass cloth. The protective layers assist in preventing portions of the sound absorbing material from passing through the perforated member 56 and into the turbine air stream.

Figure 3:
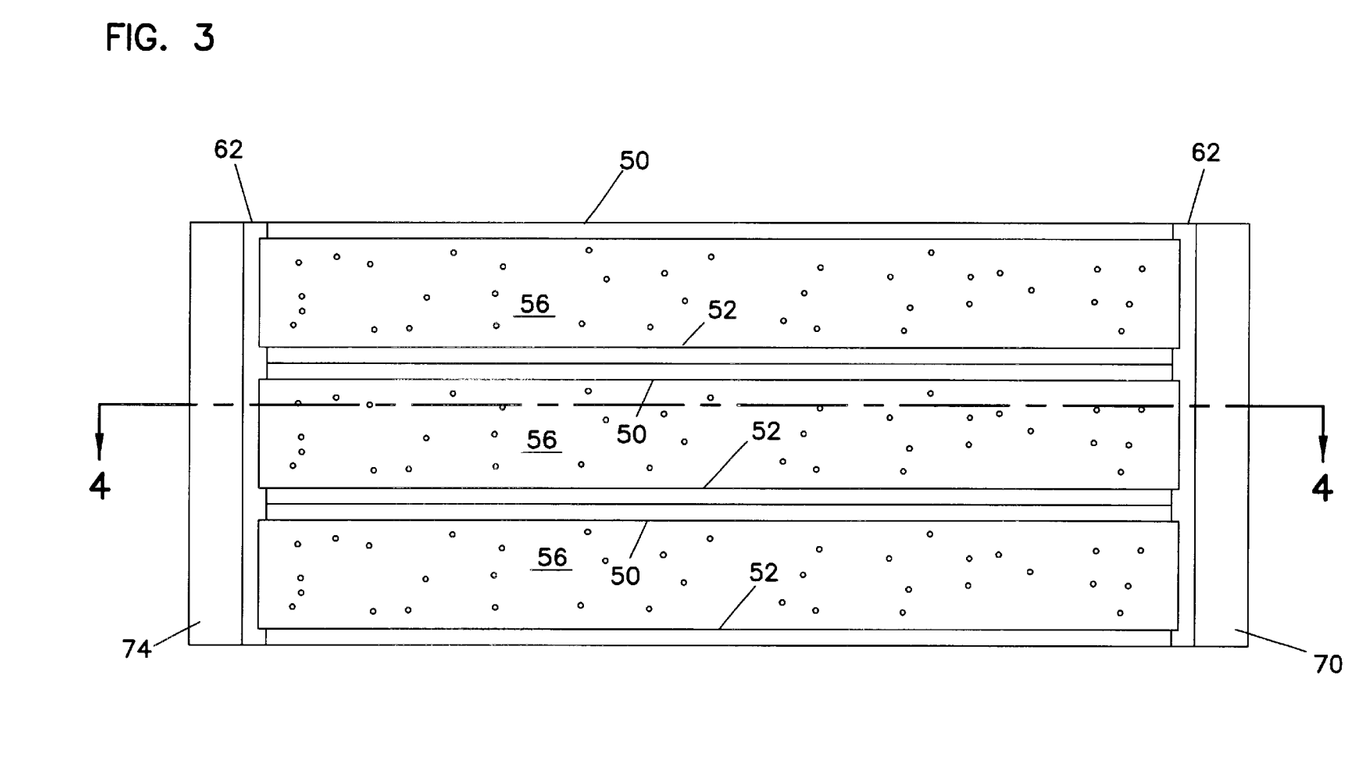
FIG. 3 is a side elevational view of the silencer of FIG. 2.

As shown in FIG. 3, end portions of the top and bottom length members 50 and 52 are connected to end members 62. For example, the ends of the top and bottom length members 50 and 52 can be welded to the end members 62. The end members 62 are substantially vertical while the top and bottom length members 50 and 52 are substantially horizontal. The end members 62 and the top and bottom length members 50 and 52 cooperate to form a generally rectangular frame work adapted for supporting the perforated members 56 and the sound absorbing material 60.

Figure 4:
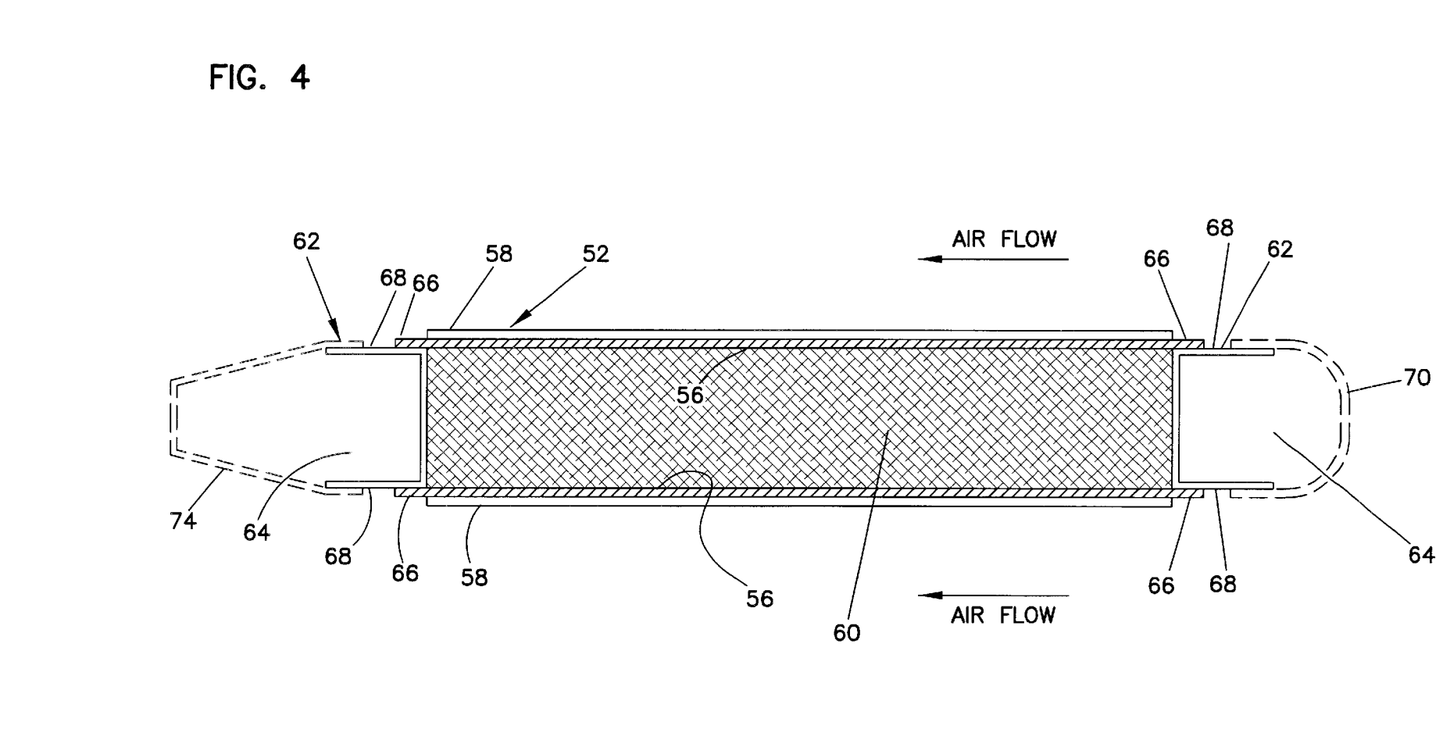
FIG. 4 is a cross-sectional view taken along section line 4—4 of FIG. 3.

As shown in FIG. 4, the end member 62 have generally C-shaped cross sections and define outwardly facing channels 64 (i.e. the channel face away from one another). The perforated members 56 are longer than the top and bottom length members 50 and 52 and include end portions 66 that overlap the end members 62. The end portions 66 are preferably fixedly connected to outer surfaces 68 of the end members 62 such that the end members 62 are fixed between the perforated members 56.

It will be appreciated that the end portions 66 of the perforated members 56 can either be perforated or not perforated. The terms "perforated" is intended to mean that the perforated members 56 define a plurality of openings, apertures or other structures suitable for allowing noise to pass through the perforated members 56. In one particular embodiment of the present invention, the end portion 66 of the perforated members 56 are welded to the end members 62.

As shown in FIGS. 3 and 4, the silencer unit 36 includes a rounded leading nose 70 for reducing the air resistance provided by the silencer unit 36. Similarly, a ramped trailing end 74 is provided for also reducing the air resistance provided by the silencer unit 36.

In use of the silencer 34, intake air passes through the air passageways 42. As the air passes through the air passageways 42, noise passes laterally through the perforated members 56 and is absorbed by the sound absorbing material 60.

To manufacture one of the silencer units 36, one of the end members 62 is first placed on a flat surface such as the ground. Next, the top and bottom length members 50 and 52 are aligned at their appropriate positions relative to the end member 62. For example, the members 50 and 52 are aligned parallel and spaced-apart with respect to one another, and perpendicular with respect to the end member 62. The intermediate members 50 and 52 are preferably aligned back-to-back and are preferably welded together. The ends of the length members 50 and 52 are subsequently connected (e.g., welded) to the end member 62. The sound absorbing material 60 is then positioned between one of the sets of perforated members 56, and the perforated members 56 are compressed together. With the perforated members 56 compressed together, the perforated members 56 and the sound absorbing material 60 are concurrently slid between their corresponding top and bottom length members 50 and 52 in a direction toward the welded end member 62. This procedure is repeated for each set of perforated members 56. When all of the perforated members 56 have been slid between their corresponding top and bottom length members 50 and 52, the second end member 62 is connected (e.g., welded) to the free ends of the top and bottom length members 50 and 52. After connecting the second end member 62 to the top and bottom length members 50 and 52, the resultant frame is checked to insure that it is square. If the frame is not square, adjustments are made to make it square. Once the framework is square, the end portions 66 of the perforated members 66 are connected (e.g., welded) to the outer surfaces 68 of the end members 62.

Figure 5:
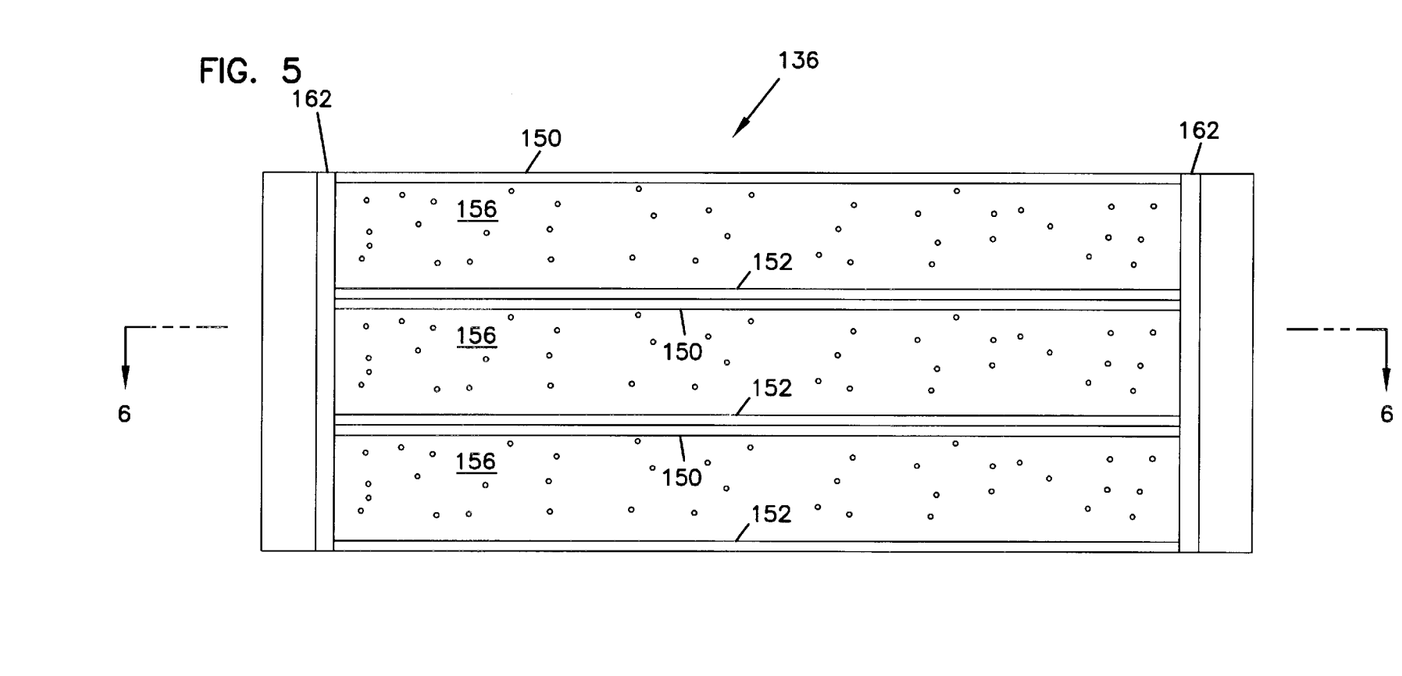
FIG. 5 is a side view of an alternative silencer constructed in accordance with the principles of the present invention.
Figure 6:
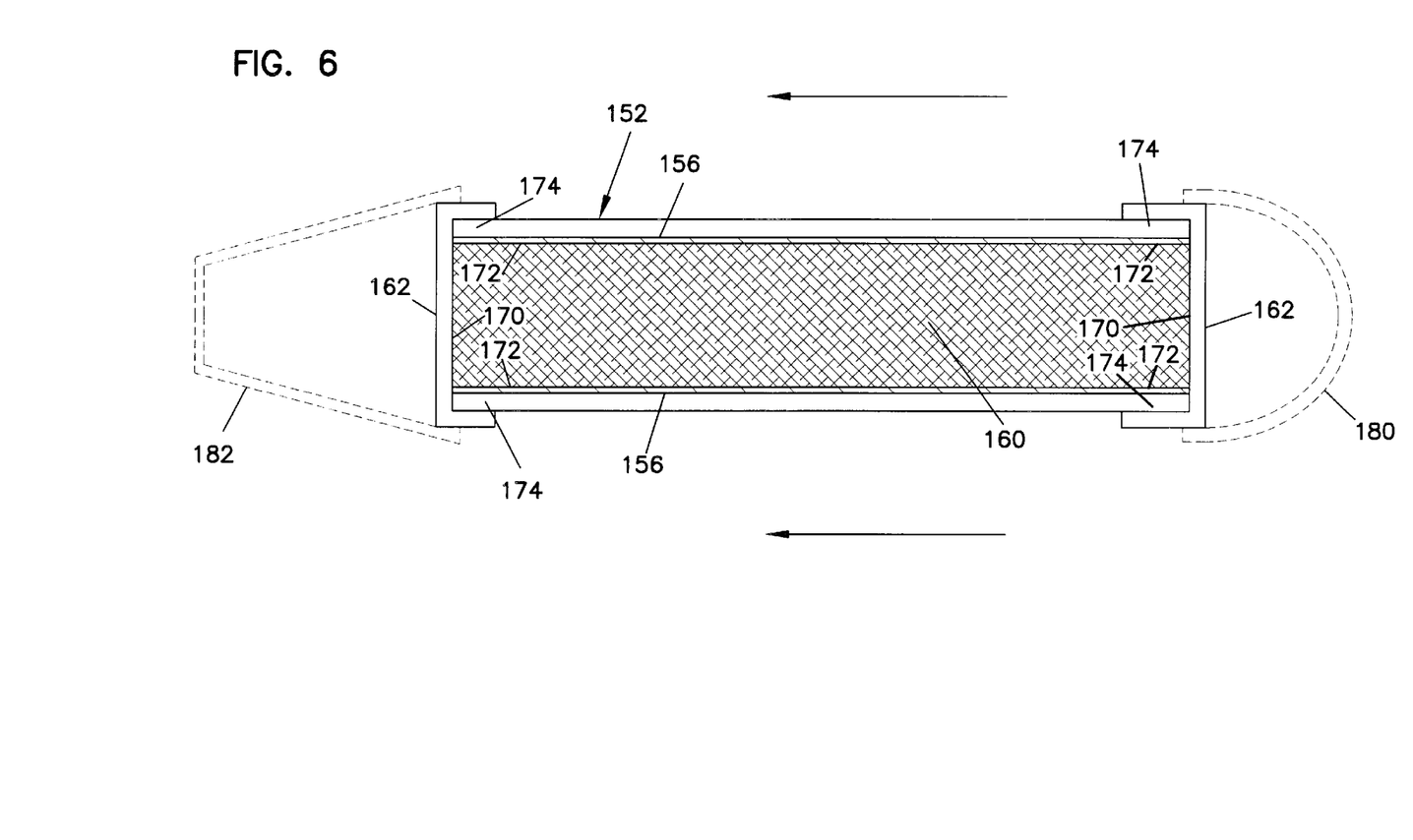
FIG. 6 is a cross-sectional view taken along section line 6—6 of FIG. 5.

FIGS. 5 and 6 shown an alternative silencer unit 136 constructed in accordance with the principles of the present invention. The silencer unit 136 includes a generally rectangular framework including two spaced-apart and substantially parallel end members 162 interconnected by a plurality of top and bottom length members 150 and 152. As previously described with respect to the top and bottom length members 50 and 52 of the embodiment of FIGS. 2–4, the top and bottom length members 150 and 52 define inwardly facing channels (not shown). Spaced-apart perforated members 156 are secured within the inwardly facing channels between the top and bottom length members 150 and 152. As shown in FIG. 6, sound absorbing material 160 is compressed between the perforated members 156. Protective sheets can be placed between the material 160 and the perforated members 156. Rounded and tapered noses 180 and 182 are used to improve the aerodynamic characteristics of the silencer unit 136.

Referring again to FIG. 6, the end members 162 define inwardly facing channels 170. The perforated members 156 include end portions 172 that fit or are received within the inwardly facing channels 170. Similarly, the top and bottom length members 150 and 152 include end portions 174 that fit within or are received by the inwardly facing channels 172 of the end members 162. Preferably, the top and bottom length members 150 and 152 are fixedly connected to the end members 162 by conventional techniques such as welding. In one particular embodiment of the present invention, the perforated members 156 are not welded or otherwise fixedly connected to the end members 162 or the top and bottom length members 150 and 152. By eliminating welds from the design, manufacturing cost and efficiency can be enhanced.

To manufacture the silencer unit 136, one of the end members 162 is placed upon a flat surface such as the ground. Next, the ends of the top and bottom length members 150 and 152 are connected (e.g., welded) at the appropriate spacing along the end member 162, and the length members 150 and 152 are perpendicularly aligned with respect to the end member 162. The intermediate length members 150 and 152 are preferably welded together in a back-to-back relationship before being connected to the end member 162. Thereafter, the sound absorbing material 160 is compressed between the perforated members 156, and each set of perforated members 156 is respectively slid between its corresponding set of top and bottom length members 150 and 152. It will be appreciated that the perforated members 156 are slid lengthwise along the top and bottom length members 150 and 152 in a direction towards the end member 162 to which the top and bottom length members 150 and 152 have been welded. After all of the sets of perforated members 156 have been slid into place, the second end member 162 is connected (e.g. welded) to the free ends of the top and bottom length members 150 and 152.

Figure 7:
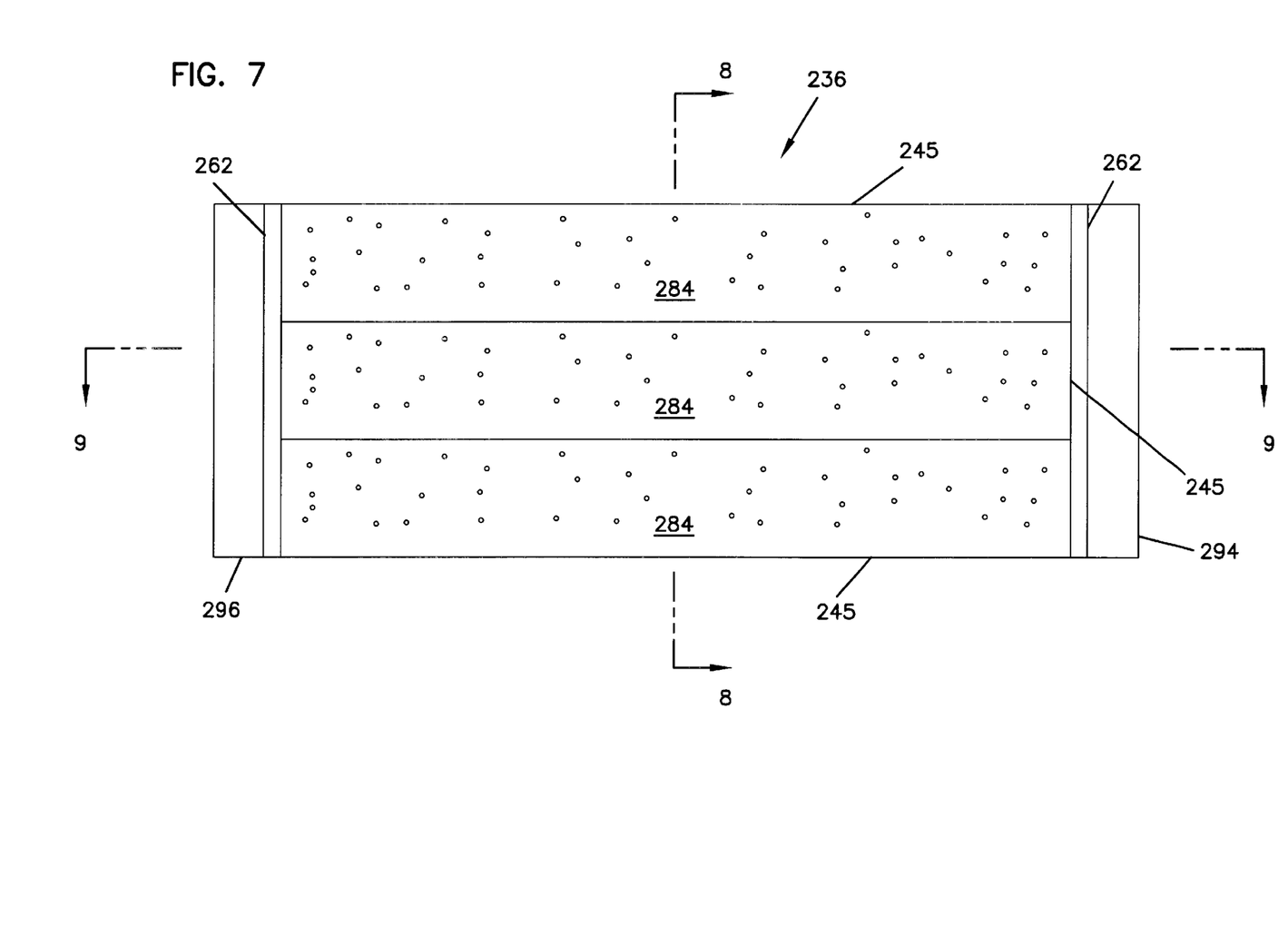
FIG. 7 is a side view of a silencer that is a further embodiment of the present invention.
Figure 8:
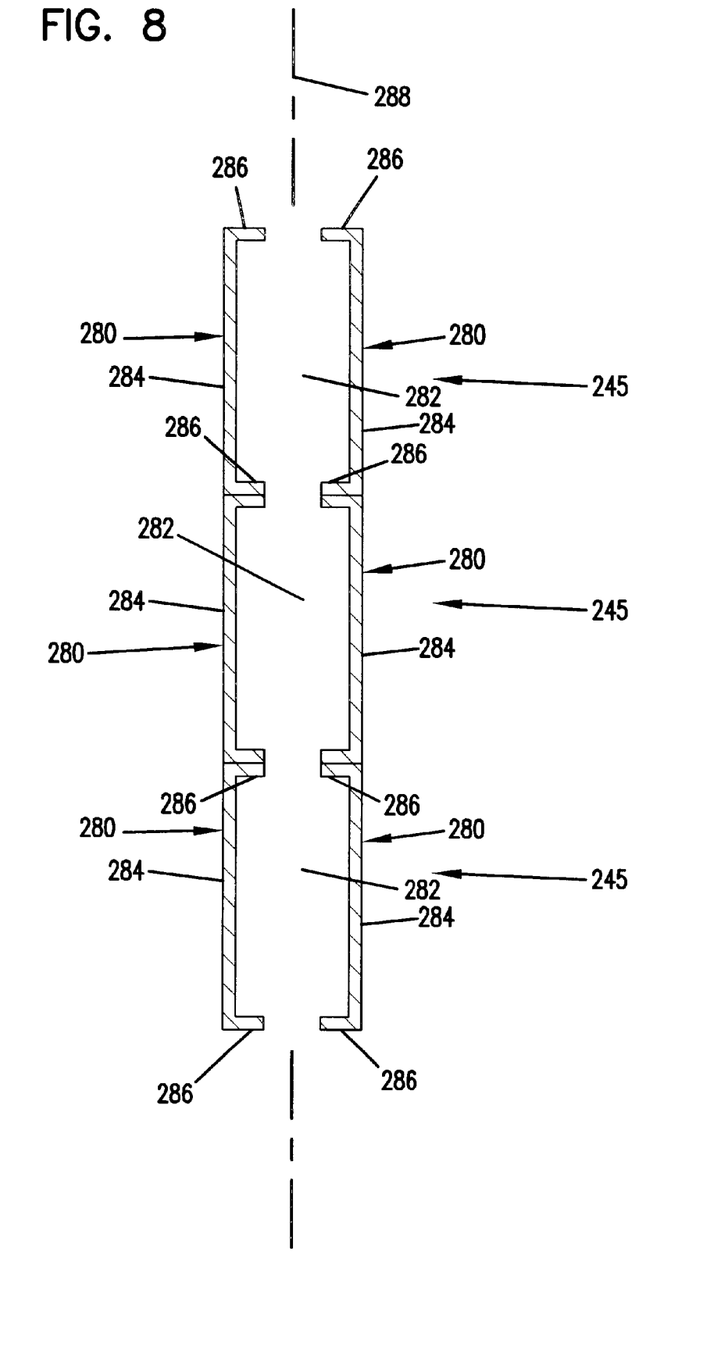
FIG. 8 is a cross-sectional view taken along section line 8—8 of FIG. 7.
Figure 9:
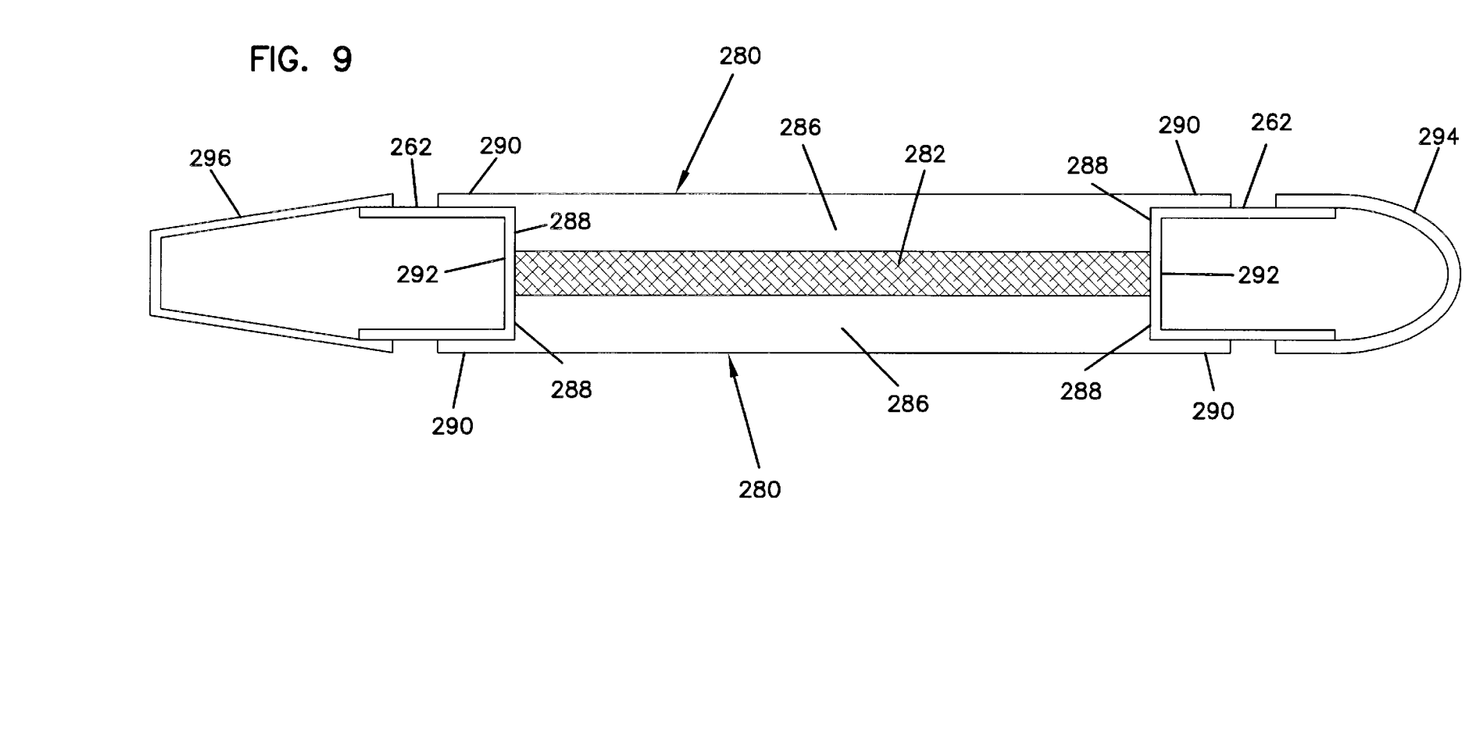
FIG. 9 is a cross-sectional view taken along section line 9—9 of FIG. 7.

FIGS. 7–9 illustrate a silencer unit 236 that is a further aspect of the present invention. The silencer unit 236 includes a plurality of vertically stacked silencer modules 245. The silencer modules 245 extend transversely between two spaced-apart, substantially parallel end members 262.

Referring to FIG. 8, each silencer module 245 includes two retaining members 280 for retaining a volume of sound absorbing material 282. The retaining members 280 extend between the end members 262 and include perforated portions 284 and reinforcing portions 286. The perforated portions 284 are preferably unitarily or integrally formed with the reinforcement portions 286. In other words, in one particular embodiment, the perforated portion 284 and the reinforcing portion 286 of one of the retaining members 280 are formed from a single sheet or piece of material that has been bent to form the two portions 284 and 286. The retaining members 280 are preferably made of a metal material such as steel, galvanized steel, stainless steel or aluminum. A preferred thickness for the retaining members 280 is in the range of 14–18 gauge. Protective sheets or layers (not shown) can be positioned between the sound absorbing material 282 and the retaining members 280.

Referring back to FIG. 8, the perforated portions 284 of each module 245 are preferably spaced-apart and substantially parallel to one another. The reinforcing portions 286 are preferably transversely aligned with respect to the perforated portions 284. As shown in FIG. 8, the reinforcing portions 286 extend inward from the perforated portions 284 toward a central plane 288 that longitudinally bisects the silencer 236 and is generally parallel with respect to the perforated portions 284.

In FIG. 8, gaps are shown between the free ends of the reinforcing portions 286. It will be appreciated that in alternate embodiments, the free ends of the reinforcing portions 286 can contact one another such that no gaps exist. Additionally, it will be appreciated that the reinforced portions 286 can be perforated or not perforated.

Referring to FIG. 9, the reinforcing portions 286 define notches 288 that correspond to the end members 262. The end members 262 are mounted between end portions 290 of the retaining members 280. The end portions 290 are preferably coplanar with respect to the perforated portions 284. In one particular embodiment of the present invention, the end portions 290 are welded to exterior surfaces of the end members 262.

Referring still to FIG. 9, the end members 262 preferably define outwardly facing channels 292. A curved nose 294 is shown attached to one of the end members 262, while a ramped nose 296 is shown attached to the other of the end members 262. The noses 294 and 296 assist in improving the aerodynamic characteristics of the silencer 236.

To manufacture the silencer unit 236, the retaining members 282 are first bent to form the perforated portions 284 and the reinforcing portions 286. Next, the sound absorbing material 282 is positioned between the retaining members 280 to form the individual modules 245. The modules 245 are then aligned in a generally stacked configuration. Next, the end members 262 are welded to the end portions 290 of the retaining members 280. One advantage of the invention is that in certain embodiments, no intermediate supports between the perforated sheets are needed to provide rigidity to the silencer. Instead, the integral reinforcing members provide rigidity to the silencer. By eliminating intermediate supports between the perforated members, a substantial number of welds can also be eliminated. Additionally, the integral reinforcement members also can eliminate the need for separate length supports extending between the end members.

With regard to the foregoing description, it is to be understood that changes may be made in detail, especially in matters of the construction materials employed and the shape, size and arrangement of the parts without departing from the scope of the present invention. It is intended that the specification and depicted aspects be considered exemplary only, with a true scope and spirit of the invention being indicated by the broad meaning of the following claims.

We claim:

1. A silencer comprising:
a generally rectangular frame including two spaced-apart and substantially parallel end members interconnected by two spaced-apart and substantially parallel length members, the length members defining inwardly facing channels;
two spaced-apart perforated members secured within the inwardly facing channels between the two-spaced-apart length members, the perforated members being longer than the length members and including end portions that overlap the end members, the end portions being fixedly connected to outer surfaces of the end members such that the end members are fixed between the perforated members; and
sound absorbing material positioned between the perforated members.

2. The silencer of claim 1, wherein the end members define outwardly facing channels.

3. The silencer of claim 1, wherein the end members and the length members have generally C-shaped transverse cross-sections.

4. The silencer of claim 1, wherein the end portions of the perforated members are welded to the end members.

5. A silencer comprising:
two substantially parallel end members arranged in spaced-apart relation along a common central plane;
a generally rectangular silencer module that extends along the central plane between the end members, the silencer module containing a volume of sound absorbing material and including opposing, spaced-apart first sides that are transversely aligned relative to the central plane, the silencer module also including opposing, spaced-apart second sides that are generally parallel to the central plane and positioned on opposite sides of the central plane, the silencer module comprising:
two retaining members each formed by a separate single sheet of material, the retaining members including perforated portions that define the second sides of the silencer module, each of the retaining members also including first and second reinforcing portions that extend transversely from their corresponding perforated portion toward the central plane, the first reinforcing portions being aligned along one of the first sides of the silencer module and the second reinforcing portions being aligned along the other of the first sides of the silencer module, and the each of the single sheets of material including bent regions that connect the perforated portions to the reinforcing portions.

6. The silencer of claim 5, wherein the reinforcing portions define notches that correspond to the end members.

7. The silencer of claim 5, wherein the end members are mounted between end portions of the retaining members, the end portions being coplanar with the perforated portions.

8. The silencer of claim 7, wherein the end portions are welded to the end members.

9. The silencer of claim 5, wherein the end members define outwardly facing channels.

10. The silencer of claim 5, wherein a plurality of the silencer modules are stacked between the end members.

* * * * *

UNITED STATES PATENT AND TRADEMARK OFFICE
CERTIFICATE OF CORRECTION

| | | |
|---|---|---|
| PATENT NO. | : 6,260,658 B1 | |
| APPLICATION NO. | : 09/178215 | |
| DATED | : July 17, 2001 | |
| INVENTOR(S) | : Jahn et al. | |

It is certified that error appears in the above-identified patent and that said Letters Patent is hereby corrected as shown below:

TITLE page, (75) Inventors, line 1: "Jahn D. Darrell" should read --Darrell D. Jahn--

TITLE PG, UNDER (12) DELETE "DARRELL" AND INSERT - - JAHN - -.

Signed and Sealed this

Twenty-second Day of August, 2006

JON W. DUDAS
*Director of the United States Patent and Trademark Office*